United States Patent [19]

Hupe et al.

[11] Patent Number: 5,156,809

[45] Date of Patent: Oct. 20, 1992

[54] APPARATUS FOR THE STEPWISE PERFORMANCE OF CHEMICAL REACTIONS

[75] Inventors: Klaus-Peter Hupe, Baden-Baden; Fred Strohmeier, Rheinmuenster, both of Fed. Rep. of Germany

[73] Assignee: Hewlett Packard Company, Palo Alto, Calif.

[21] Appl. No.: 759,852

[22] Filed: Sep. 16, 1991

Related U.S. Application Data

[63] Continuation of Ser. No. 152,699, Feb. 5, 1988, abandoned.

[30] Foreign Application Priority Data

Feb. 25, 1987 [EP] European Pat. Off. ........ 87102684.5

[51] Int. Cl.⁵ ..................... G01N 33/68; G01N 35/00
[52] U.S. Cl. ..................... 422/64; 422/68.1; 422/72; 422/116; 436/45; 436/54; 436/89
[58] Field of Search ........ 422/58, 63, 64, 67, 422/68.1, 72, 100, 104, 112, 116, 131; 436/43, 45, 51, 54, 89; 73/864.01, 864.25

[56] References Cited

U.S. PATENT DOCUMENTS

| | | | |
|---|---|---|---|
| 3,615,230 | 10/1971 | Barnick | 422/64 |
| 3,717,436 | 2/1973 | Penhasi et al. | 23/253 R |
| 3,725,010 | 4/1973 | Penhasi | 23/230 R |
| 3,801,283 | 4/1974 | Shapiro et al. | 422/64 |
| 3,892,531 | 7/1975 | Gilbert | 23/253 R |
| 4,065,412 | 12/1977 | Dreyer | 260/8 |
| 4,252,769 | 2/1981 | Hood et al. | 422/50 |
| 4,259,289 | 3/1981 | Curry et al. | 422/64 |
| 4,276,051 | 6/1981 | Ginsberg et al. | 422/64 |
| 4,276,260 | 6/1981 | Drbal et al. | 422/64 |
| 4,325,909 | 4/1982 | Coulter et al. | 422/63 |
| 4,815,978 | 3/1989 | Mazza et al. | 422/63 |
| 4,849,176 | 7/1989 | Sakagami | 422/65 |
| 5,019,348 | 5/1991 | Ohms et al. | 436/89 X |

FOREIGN PATENT DOCUMENTS 0305791  4/1974  U.S.S.R. ................ 436/89

OTHER PUBLICATIONS

Edman, *Protein Sequence Determination*, Published by Spring-Verlog, N.Y., 1970, pp. 211-255.

*Primary Examiner*—Robert J. Hill, Jr.

[57] ABSTRACT

An apparatus for the stepwise performance of chemical reactions characterized by a cup-shaped reactor vessel spinning around its longitudinal axis, and a pipette for applying samples, reagents, and solvents onto the inner wall of the vessel. The pipette is rotatable around an axis, and can be positioned at a location from which it can be lowered into reservoirs for drawing in or for ejecting liquid. The pipette can furthermore be positioned at a location from which it can be lowered into the vessel for applying sample, reagents or solvents onto its inner wall or it can be positioned at a location from which it can be lowered to remove reaction products and excess products from the bottom of the vessel. The apparatus can be used for automatically sequencing proteins and/or peptides.

9 Claims, 2 Drawing Sheets

APPARATUS FOR THE STEPWISE PERFORMANCE OF CHEMICAL REACTIONS

This application is a continuation of application Ser. No. 07/152,699, filed Feb. 5, 1988, now abandoned.

BACKGROUND OF THE INVENTION

1. Field of the Invention

This invention relates generally to apparatus for the stepwise performance of chemical reactions, and more particularly to apparatus for sequencing proteins and/or peptides.

2. Description of the Related Art

The sequence of amino acids in a protein, i.e. the linear succession of the individual amino acids, is a deciding criterion for its higher structure and, subsequently, for the biological function of the protein. The sequencing of proteins is thus of considerable importance in biochemical research and industry such as, for example, genetic engineering. As used herein no distinction is made between proteins, peptides and polypeptides: the whole group of these substances is addressed when the term "protein" is used.

A protein sequenator for the automatic determination of amino acid sequences in proteins is known from P. Edman and G. gg, European Journal of Biochemistry, Vol. 1, 1967, pages 80–91. This sequenator operates on the principle of the phenylisothiocyanate degradation scheme. According to this degradation process, the free N-terminal alpha-amino group is first converted in a coupling step in a basic environment with phenylisothiocyanate (PITC) into a phenyl thiocarbamyl (PTC) derivative. The phenylthiocarbamyl derivative is cleaved in a strongly acidic environment and is cyclized with formation of an anilothiazolinone derivative (ATZ) which can be converted by treatment with aqueous acid into the more stable phenylthiohydantoin (PTH) derivative. The alpha-amino group of the following amino acid in the chain of amino acids is thus set free and can be subject to a further degradation step similar to the one described. The PTH amino acid can be identified using liquid chromatography.

The sequenator known from the above-mentioned article by Edman and Begg, which is also known from U.S. Pat. No. 3,725,010, comprises a reaction vessel wherein the degradation of proteins to be determined takes place and a plurality of reservoirs for storing reagents and solvents. The reservoirs are under a constant pressure and, by opening appropriate valves, a liquid or gas stream can be fed to the reaction vessel. The reaction vessel is a cylindrical glass cup which spins continuously around its longitudinal axis. The protein is applied as a thin film on the inner wall of the cup. Reagents and solvents entering through a feed line at the bottom of the cup climb up the inner wall due to centrifugal forces and accumulate in a circular groove near the upper rim of the cup. The accumulated liquids are scooped off with a bilge pipe and leave through an effluent line.

In this known sequenator, the application of the protein layer and the guiding of the liquid film of reagents and solvents across the protein layer are not very precise, and comparatively high quantities of protein and liquid are required in order to obtain acceptable reaction yields. Furthermore, as the reagents wherein the proteins are soluble slide across the protein layer towards the circular groove at the rim of the vessel they gradually wash away the proteins.

From U.S. Pat. No. 3,892,531 and from U.S. Pat. No. 4,065,412, devices for sequencing proteins are known which tend to avoid the washing away of the proteins by the solvents and reagents. In these devices, the protein is deposited on a porous surface, for example on a paper strip or on a fibre glass web, and the reagents are applied as vapor. The reaction velocity and the completeness of the reaction, however, are reduced when using the reagents in gaseous or vapor state relative to the liquid state in the Edman process. Furthermore, the protein agglomerates in the cavities of the porous material causing a decrease of the surface of the protein sample and it depends on the properties of the specific protein and on other unforeseen occurrences in which way the protein spreads on the porous surface. As a consequence thereof, there are regions where the protein accumulates so that the accessibility of reagents and solvents is reduced, whereas in other regions there is little or no protein so that the reagents pass there without reaction. These are the main reasons that such gaseous phase methods have comparatively low reaction yields.

SUMMARY OF THE INVENTION

It is an object of this invention to provide an apparatus for the stepwise performance of chemical reactions which permits higher reaction yields and a better control of the reaction process, which permits the use of smaller amounts of sample, reagents and solvents, and which is uncomplicated in construction.

Briefly, the apparatus of the present invention includes a cup-shaped reactor vessel spinning around its axis with a feed system for successively introducing into the reactor vessel various reagents and solvents, and an out-take system for removing reaction products and excess products. The feed system includes a feed tube the opening of which can be arranged close to the inner wall of the reactor vessel such that reagents and solvents can be applied onto the sample substance. The out-take system comprises an out-take tube for removing reaction products and excess products from the bottom of the reactor vessel.

The invention allows the reagents to be deposited as a film onto the sample substance, for example on a protein to be analyzed. Consequently, relative motion between the sample substance and the reagents causing the washing away of the protein is avoided. Since the protein and the reagents are applied as liquid films on each other they have a large contact area which also contributes to a high reaction yield.

In order to produce a still more uniform liquid film, the feed tube can be moved up and down during the application of the film on the wall of the rotating cup. The rotational speed of the reactor vessel can be reduced while solvents are delivered to the wall so that reaction products or solutions run down the wall in spirals and gather at the bottom of the vessel. This is done in a protein sequencing process for washing out reaction excess products and for extracting ATZ amino acids. When the rotation of the vessel is stopped the collected liquid can easily be removed from the bottom.

The invention has the additional advantages that solvents and reagents reach the reactor vessel and other vessels on very short paths without contacting movable parts or seals. Thus, the problems of the prior art are avoided wherein the delivered substances come into contact with the surfaces of the feeding tubes and with the movable parts of the valves and be absorbed there resulting in contamination of the liquids which flow through the tube at a later point in time or resulting in leakage.

Furthermore, the invention permits precise metering of small amounts of liquid and makes it possible to use smallest amounts of sample substance, e.g. less than 100 picomole of a protein. The required quantities of reagents and solvents and the quantities of excess products are small. Due to the intense contact between the sample substance on one hand and the reagents and solvents on the other hand, the reaction times are short which is particularly advantageous when the number of reactions to be performed is very large as, for example in protein sequencing. Also, since the design of the apparatus according to the invention is simple, it is less susceptible to faults than the more complicated prior art systems.

A further advantage of the invention is that the initial yield and the repetitive yield of the reactions performed with the apparatus can be increased compared to prior art devices and that the reaction products, for example the PTH amino acids in a protein sequencing process, are obtained in concentrated form with few impurities, thus leading to a low detection limit for the subsequent chromatographic analysis.

DETAILED DESCRIPTION OF THE PREFERRED EMBODIMENTS

Figure 1:
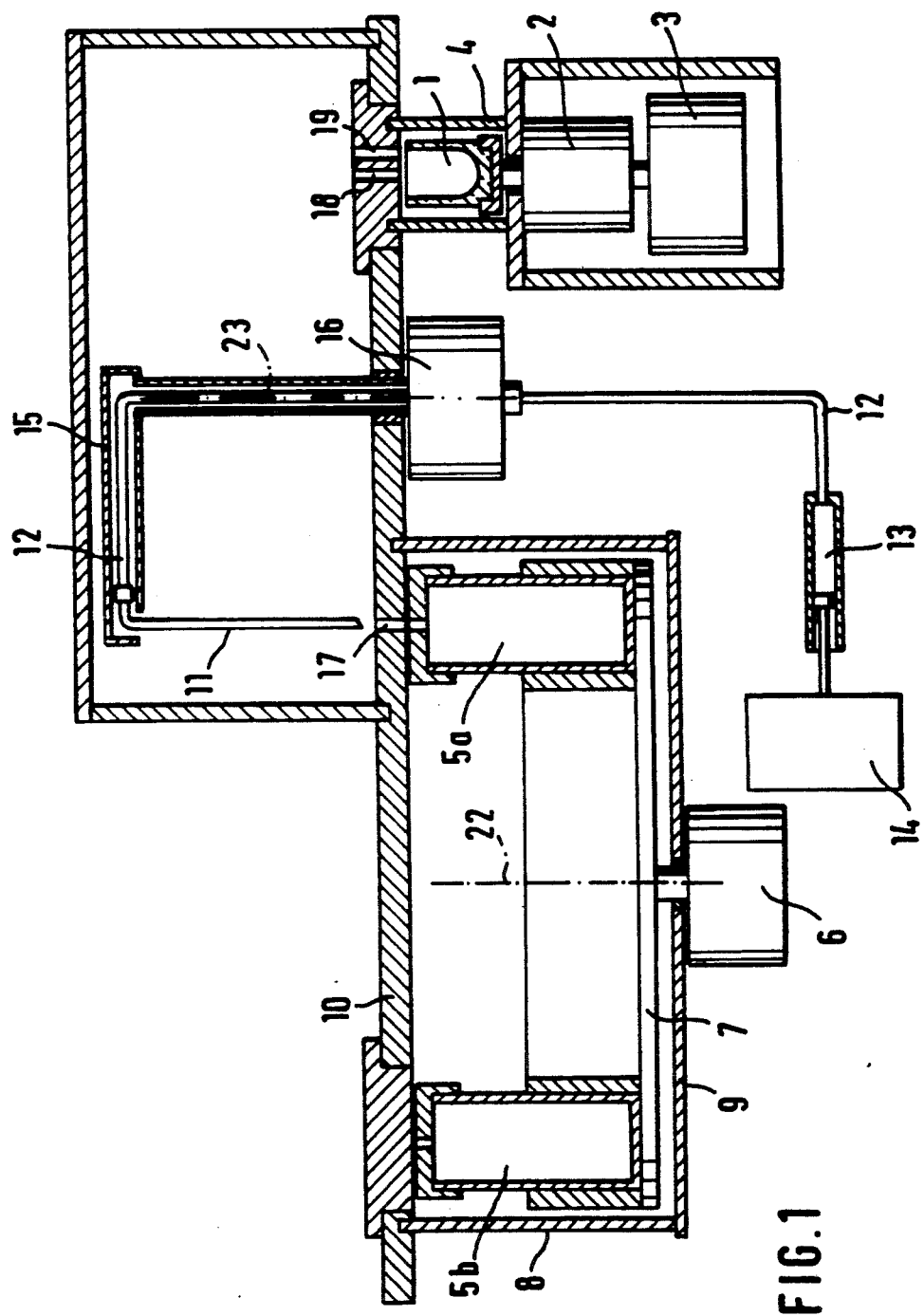
FIG. 1 schematically shows an apparatus according to the invention which can be used as a protein sequenator.

The apparatus according to the present invention includes a reactor vessel 1 wherein the chemical reactions, for example the degradation of proteins as described above, take place. The generally cylindrical reactor vessel 1 is secured to a rotatable shaft 2 which is driven by a motor 3. Details of the reactor vessel 1 are described below with reference to FIG. 2. The reactor vessel 1 is arranged in a chamber formed by a cylinder 4 which is sealed off at its top and at its bottom.

The apparatus further includes supply reservoirs 5a and 5b for reagents and for solvents arranged on a carousel 7 which can be rotated by means of a motor 6. The supply reservoirs 5a and 5b including the carousel 7 are located in a sealed chamber formed by a cylinder 8, a plate 9 and a central plate 10. The reservoirs 5a and 5b can also be used for receiving cleaning or rinsing liquid and as a waste container.

A micropipette 11 is connected via a movable capillary tube 12 with a pump 13 which is operated by a motor 14. The pump can be, for example, a syringe. The pipette 11, the capillary tube 12, and the pump 13 form a dispensing system which allows liquids to be drawn in and metered out. The pipette 11 with the tube 12 are mounted on a pipette holder 15 which can be rotated about the axis 23 and which can be lowered and raised. A drive element 16 is provided for performing these movements. The pipette 11 can dip into one of the reservoirs 5a and 5b through the bore 17 or it can dip into the center of the reaction vessel 1 through the bore 18. A second bore 19 in the plate covering reaction vessel 1 is located outside the center of the vessel close to its wall. The bores 17, 18, and 19 are located on a single circle described by the tip of pipette 11 when rotating around the axis 23. The bore 19 indicated in FIG. 1 is therefore not exactly located in the cutting plane containing bores 17 and 18 but somewhat out of this plane. As a practical example, the pipette 11 may have an inner diameter of 0.8 mm and an outer diameter of 1.6 mm.

When the pipette 11 is lowered through the off-center bore 19 the tip of the pipette 11 comes into close proximity of the inner wall of the reaction vessel without contacting it. In that way, liquids and substances dissolved therein can be deposited directly on the wall of the reactor vessel 1. Additional openings on the circle described by the tip of the pipette 11 can be provided which permit access to further containers, for example to converting vessels or a fraction collector. Such openings have appropriate locks. Each chamber of the system comprises connections which permit a continuous purge with inert gas. In that way, and by the inherent sealing-off of the apparatus the access of ambient air is prohibited and the exchange of substances between the various regions of the apparatus is reduced to a minimum. Particularly in protein sequencing, some of the reactions are extremely sensitive to oxygen and water so that the whole system has to be operated under inert gas atmosphere. Furthermore, the reagents required for protein sequencing are corrosive (pH value: 0-9) and ill-smelling so that the sealing of the containers wherein they are stored and the chambers of the protein sequenator is important.

Figure 2:
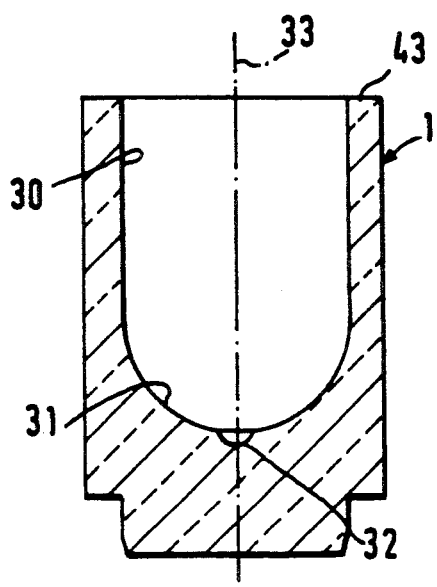
FIG. 2 is a cross-sectional view of a reactor vessel in an apparatus according to the invention.

An embodiment of the reactor vessel 1 is shown in more detail in FIG. 2. The reactor vessel 1 has the shape of a cup with a cylindrical upper portion 30 and a lower portion narrowing at the bottom. The bottom of the cup has the form of a hemisphere 31 and comprises at its lowest point a recess 32 wherein liquid can accumulate and which is accessible to the pipette 1!. The reactor vessel 1 is secured with its lower portion to the shaft 2 (FIG. 1).

In operation, the vessel 1 spins around axis 33. The vessel 1 can be made, for example, of a glass or ceramic material. As a practical example, the inner diameter of the vessel may be 15 millimeters and the height from the bottom of the vessel to its upper rim 43 may be 22.5 millimeters.

Figure 3A:
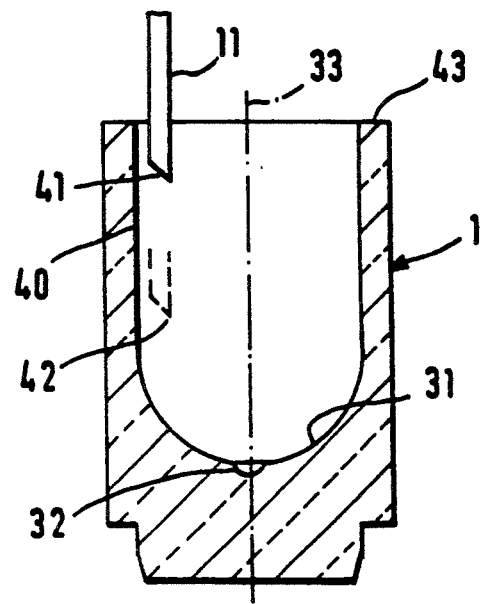
FIGS. 3A, 3B and 3C show the reactor vessel and a pipette for introducing and removing liquid at different steps of a chemical process.
Figure 3B:
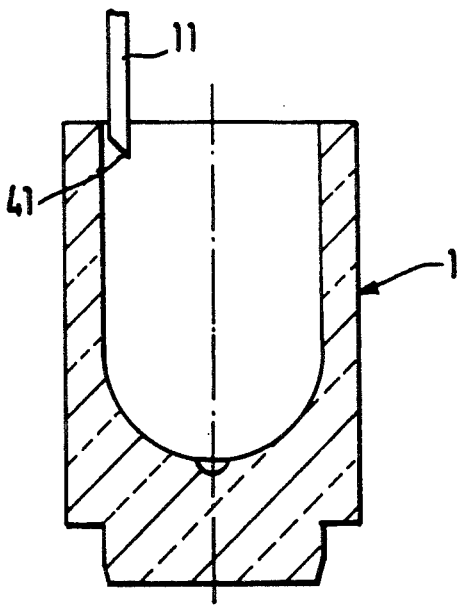

The operation of the apparatus according to the invention is now further explained with reference to FIGS. 3A to 3C. According to FIG. 3A, the protein to be analyzed is pipetted onto the inner wall 40 by means of pipette 11 when the vessel 1 is rapidly spinning. A typical rotational speed can be, for example, 6000 revolutions per minute. The tip 41 of the pipette 11 can be inclined as shown in the drawing to ensure easy application of the protein onto the wall. The resulting protein strip has a width of a few millimeters and forms a very uniform film which is easily accessible. When the pipette is moved up and down during the application of the protein, the resulting film is even more uniform. In FIG. 3A, the lower extreme position of the tip of the pipette 11 during its up and down movement is indicated by dashed lines 42.

In a next step, the pipette 11 is raised above the upper rim 43 of the vessel 1, and the whole pipette-tube assembly 11, 12, 15 (FIG. 1) is rotated around axis 23 so that the pipette tip is located above the bore 17 (FIG. 1).

After a reservoir with the reagent needed in this reaction step has been positioned below the bore 17 by turning the carousel 7, the pipette 11 is lowered and a predetermined amount of liquid is drawn in by controlling the pump 13 appropriately. Then, the pipette 11 is raised, rotated back until the tip is positioned above the bore 19 and lowered into the vessel 1. The pump 13 is then controlled to discharge the liquid from the pipette 11 onto the wall. Thus, the reagent is placed as a uniform layer upon the protein film. If desired, the pipette can be moved up and down during the discharge of the reagent, similarly as in the application of the protein film in a previous step.

It is an important feature of the invention that in this way the reagents are brought into contact with the protein film without relative movement between the proteins and the reagents. Since there is no relative movement, washing away of the protein is avoided. This is a substantial difference to the prior art wherein the reagents flow across the protein and wash away a portion of it. In contrast thereto, according to the invention, the reagent layer is put onto the protein layer ensuring intimate contact between the two layers and avoiding the flushing away of the protein layer.

When the reagent layer has been applied on the protein layer, the water and the volatile components contained therein are removed from the protein film by evaporation and the non-volatile components are washed out with organic solvents. For washing out surplus liquid and for extracting the ATZ amino acids the pipette 11 is raised again, rotated until it is positioned above bore 17 and lowered into a container with the appropriate solvent which has been placed below bore 17. When the desired amount of solvent has been drawn in, the pipette is rotated back to the position above bore 19 and lowered until the tip 41 of the pipette is positioned above the upper rim of the protein film, as shown in FIG. 3B. The rotational velocity of the reactor vessel 1 is reduced such that the solvents pipetted onto the wall above the protein film run across the protein film on helical paths and are finally collected at the bottom of the reactor. The speed of revolution for this step can be, for example, 600 revolutions per minute.

Figure 3C:
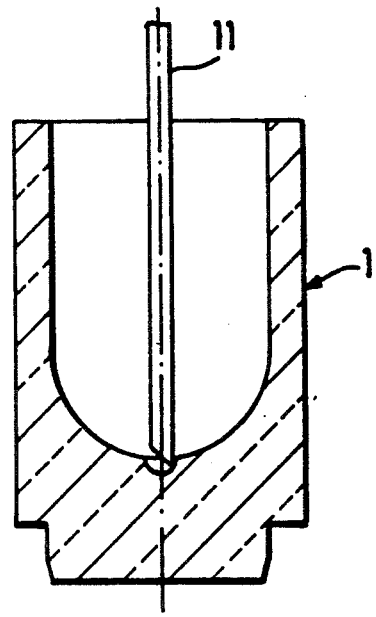

When the vessel 1 is at rest, and after the pipette 11 has been moved through the central bore 18 in the position shown in FIG. 3C, the solvent containing the ATZ amino acid or a waste product is drawn in by the pipette 11 and supplied either to a converting vessel or to a waste container. The determination of the cleaved-off amino acid can be performed using liquid chromatography on the basis of the different retention times of the amino acids. Then, the above described steps can be repeated to cleave-off the next amino acid in the amino acid chain of the protein.

The protein layer deposited on the inner wall of the reactor vessel 1 can be heated without contact by resistance heating. The protein layer can be dried with inert gas supplied through a port in its immediate neighborhood.

While this invention has been described in terms of several preferred embodiments, alterations and permutations thereof will undoubtedly become apparent to those skilled in the art after studying this disclosure. For example, it is clear the apparatus according to the invention can also be used for the analysis of sequential chemical reaction processes other than proteins, e.g. for the synthesis of oligonucleotides or peptides. It is therefor intended that the following appended claims determine the true spirit and scope of the present invention.

What is claimed is:

1. An apparatus for the stepwise performance of chemical reactions where sample substances, reagents, and solvents are applied during rotation of a reactor vessel comprising:
   a cup-shaped reactor vessel having a longitudinal axis and an inner wall;
   a spinning means for rotating said reactor vessel around its longitudinal axis;
   a feed system having a feed tube for applying into said reactor vessel sample substances, reagents, and solvents, said feed tube defining an opening at one end directed toward the inner wall of said reactor vessel, said feed tube being controllably positionable during the application of sample substances, reagents, and solvents; and
   an out-take system having an out-take tube for removing reaction products and excess products from a bottom portion of said reactor vessel.

2. An apparatus as claimed in claim 1 wherein said inner wall of said rector vessel forms a rotationally symmetrical body with a cylindrical upper portion, and with a hemispherical bottom portion provided with a recess for collecting liquid.

3. An apparatus for the stepwise performance of chemical reactions where sample substances, solvents, and reagents are applied during rotation of a reactor vessel comprising:
   a cup-shaped reactor vessel having a longitudinal axis and an inner wall;
   a spinning means for rotating said reactor vessel around its longitudinal axis;
   a feed system having a feed tube for applying into said reactor vessel sample substances, reagents and solvents, said feed tube having an opening at one end, the end of said feed tube positioned proximate the inner wall of said reactor vessel, wherein said feed tube moves while sample substances, reagents, and solvents are applied;
   an out-take system having an out-take tube for removing reaction products and excess products from a bottom portion of said spinning reactor vessel; and
   means for moving said feed tube up and down during application of sample substances, solvents, and reagents while said reactor vessel is spinning such that uniform films of sample substance and reagents can be spread over said inner wall.

4. An apparatus as claimed in claim 3 wherein:
   said feed tube further comprises a movable pipette having an opening at a tip placeable; and
   said out-take tube further comprises said movable pipette placeable proximate to said bottom portion of said reactor vessel.

5. An apparatus as claimed in claim 4 further comprising means for varying the rotational speed of said reactor vessel, such that the rotational speed of said vessel may be reduced while solvents are being applied, thereby permitting fluids to flow down said wall and together at said bottom portion of said vessel.

6. An apparatus as claimed in claim 5 further comprising a capillary tube coupled to said movable pipette such that said movable pipette and said capillary tube form an arm which is rotatable around an axis such that it can be positioned above a center of said reactor vessel, above said reactor vessel close to said inner wall of said vessel, and above a liquid reservoir.

7. An apparatus as claimed in claim 6 further comprising a controllable pump coupled to said capillary tube and adapted to draw in or eject adjustable amounts of liquid through said opening at the tip of said movable pipette.

8. An apparatus as claimed in claim 6 further comprising a rotatable support surface supporting a plurality of liquid reservoirs such that an individual liquid reservoir can be rotated into a position where said movable pipette can be lowered into said individual liquid reservoir.

9. An apparatus for stepwise performance of chemical reactions wherein a sample substance is applied on an inner wall of a reactor vessel comprising:
- a cup-shaped reactor vessel rotatable about a longitudinal axis of the reactor vessel;
- an out-take system further including an out-take tube movable during reactor vessel rotation for removing reaction products and excess products from a bottom portion of said rotatable reactor vessel; and,
- a feed system for successively introducing reagents and solvents into the rotatable reactor vessel, said feed system further including:
- a feed tube movable during reactor vessel rotation and having an opening through which liquids exit the feed system; and,
- means for driving said movable feed tube opening close to an inner wall of said spinning rotatable reactor vessel such that a sample substance can be applied through said opening onto said inner wall and such that reagents and solvents can be applied through said opening onto said sample substance.

* * * * *